(12) United States Patent
Ray

(10) Patent No.: US 6,289,083 B1
(45) Date of Patent: Sep. 11, 2001

(54) METHOD OF IDENTIFYING A LOCATION OF A SOURCE OF AN EMERGENCY CALL IN A CALL CENTER ENVIRONMENT

(75) Inventor: Debes Ray, Carol Stream, IL (US)

(73) Assignee: Rockwell Electronic Commerce Corp., Wood Dale, IL (US)

( * ) Notice: Subject to any disclaimer, the term of this patent is extended or adjusted under 35 U.S.C. 154(b) by 0 days.

(21) Appl. No.: 09/505,210

(22) Filed: Feb. 16, 2000

(51) Int. Cl.$^7$ .................................................. H04M 11/04
(52) U.S. Cl. .................................. 379/49; 379/45; 379/37
(58) Field of Search .......................................... 379/37–51

(56) References Cited

U.S. PATENT DOCUMENTS 5,161,180 * 11/1992 Chavous .................................. 379/45
5,235,630 * 8/1993 Moody et al. .......................... 379/45
5,347,567 * 9/1994 Moody et al. .......................... 379/45

* cited by examiner

*Primary Examiner*—Wing F. Chan
(74) *Attorney, Agent, or Firm*—Welsh & Katz, Ltd.

(57) ABSTRACT

A method and apparatus are provided for routing emergency calls received by an automatic call distributor from a plurality of agent workstation in diverse geographical locations. The method includes the steps of receiving an emergency call by the automatic call distributor from an agent workstation of the plurality of agent workstations and retrieving an identifier of a predetermined public safety entity responsible for serving the local of the workstation from a database of the automatic call distributor. The method further includes the step of forwarding the call along with an identifier of the agent workstation to the public safety entity.

34 Claims, 2 Drawing Sheets

METHOD OF IDENTIFYING A LOCATION OF A SOURCE OF AN EMERGENCY CALL IN A CALL CENTER ENVIRONMENT

FIELD OF THE INVENTION

The field of the invention relates to telephonic communication systems and more particularly to automatic call distributors.

BACKGROUND OF THE INVENTION

Automatic call distribution systems are known. Such systems are typically used in an organizational context as a means of distributing telephone calls among agents of the organization.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are considered equal, the automatic call distributor (ACD) may distribute the calls based upon which agent position (telephone) has been idle the longest.

Alternatively, calls may be classified by type and an agent with the best skill for that call type may be assigned to the call. Classification of calls may be based upon any number of different criteria (e.g., an identify of the caller, the number called, etc.).

To facilitate receiving calls from the switch of the ACD an agent may sign-on to any workstation at the beginning or at any time during his work shift. Signing-on may be accomplished by entering an agent's name and a password. The entered name and password may be transferred through a port of the switch providing the connection with the workstation to a controller of the ACD.

Upon receiving a name, and password, a controller of the ACD by reference to a database, may retrieve a set of records identifying the agent and the skills of that agent. The controller may then route calls to the agent based upon the identify of the agent and the port of the switch received the sign-on information.

Within the ACD, each agent is provided with a workstation that may include an agent console (i.e., a telephone) and a computer terminal. In large organization large numbers of workstations may be provided, which are distributed over many locations. While such systems work well, they typically do not facilitate the handling of emergency calls from agents. Often ACDs are not programmed to recognize or route 9-1-1 calls. Where an ACD can route 9-1-1 calls, the public safety entity receiving the call must inquire as to the identity of the agent and his location. Accordingly, a need exists for a means of processing emergency calls from agents, that automatically provides the location of the agent to the public safety entity.

SUMMARY

A method and apparatus are provided for routing emergency calls received by an automatic call distributor from a plurality of agent workstation in diverse geographical locations. The method includes the steps of receiving an emergency call by the automatic call distributor from an agent workstation of the plurality of agent workstations and retrieving an identifier of a predetermined public safety entity responsible for serving the locale of the workstation from a database of the automatic call distributor. The method further includes the step of forwarding the call along with an identifier of the agent workstation to the public safety entity.

DETAILED DESCRIPTION OF A PREFERRED EMBODIMENT

Figure 1:
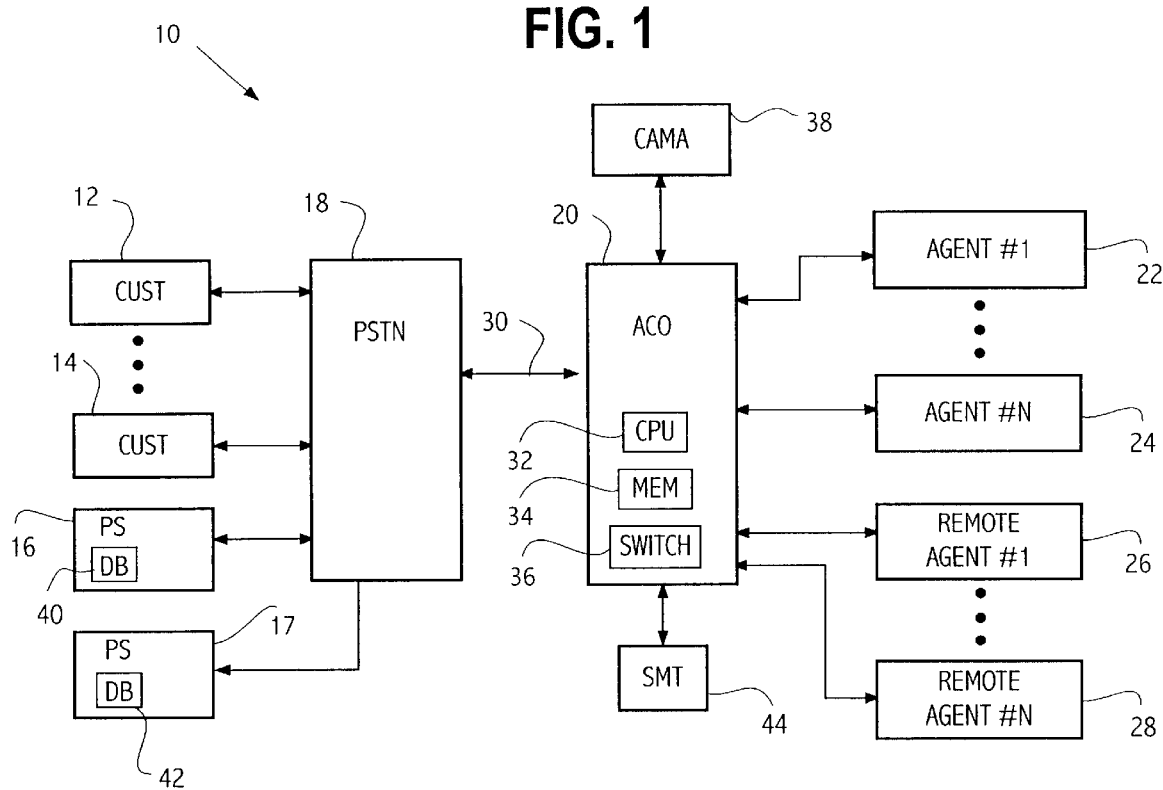
FIG. 1 is a block diagram of an automatic call distributor in a context of use in accordance with an illustrated embodiment of the invention.

FIG. 1 is a block diagram of an ACD system 10, generally in accordance with an illustrated embodiment of the invention. Included within the system 10 is an ACD 20 and agents #1-N working through agent consoles 22, 24, 26, 28. At least some of the agent consoles 22, 24 may be located proximate (e.g., within 1,000 feet of) the ACD 20.

Other agent consoles 26, 28 may be located remotely from the ACD 20. Methods of connecting remotely located agent consoles 26, 28 with the ACD 20 are well known in the prior art, as described in U.S. Pat. Nos. 5,864,615 and 5,400,327, assigned to the assignee of the present invention.

Under the illustrated embodiment, an agent (e.g., agent #1 may sign onto a console (e.g., 22) by dialing a number and entering a personal identification number (PIN). The CPU 32 may detect the PIN number and correlate that PIN number with an identifier of the sign-on console 22. The identifier may be provided by a workstation identifier transferred directly from the console 22 or determined by the CPU 32 based upon the identity of the port of the switch 36 receiving the information.

Agents #1-N may move among consoles at will, signing onto a new console whenever convenient or required. In general, the CPU 32 tracks agents based upon the console which was last used for sign-on by a particular agent. For simplicity, reference hereinafter will sometimes be made to the agent by reference to the console last used for sign-on.

Outgoing calls may be placed to customers 12, 14 by a central processing unit (CPU) 32 of the ACD 20. Alternatively, incoming calls may be initiated by customers 12, 14. The outgoing calls may be part of a sales campaign. The incoming calls may be customers calling to place orders.

In either case, when a call (incoming or outgoing) is detected by the CPU 32, the CPU 32 acts to select an agent 22, 24, 26, 28 to handle the call. The CPU 32 may select an agent based upon which agent has been idle the longest or upon which agent is deemed to be the most qualified to handle the call.

In order to select the most qualified agent, the CPU 32 may classify each call based upon a range of criteria relating to the call. For example, where the call is an outgoing call, the telephone number of the called party may have been retrieved from a call list derived from a customer database contained in a memory 34. Where the identity of the called party is known to the CPU 32, the CPU 32 may select the agent 22, 24, 26, 28 who is the most familiar with the interests of the customer.

Similarly, where the call is an incoming call, the CPU 32 may receive a telephone number of the caller 12, 14 from an automatic number identification (ANI) feature operating from within the PSTN 18. By knowing the telephone number of the caller, the CPU 32 may be able to identify a customer file. By identifying a customer file, the CPU 32 may use the information in the customer file to identify the most qualified agent.

Further, where the CPU 32 cannot identify the caller as an existing customer, the CPU 32 may still be able to assign the call based upon a dialed number identification service (DNIS) also operating within the PSTN 18. For example, where the owner of the ACD system 10 is a department store, a different telephone number may be provided for each of several departments. By knowing the number dialed, the CPU 32 may select an agent qualified for the subject matter of the number called by the caller 12, 14.

In any case, once the CPU 32 has selected an agent 22, 24, 26, 28 to handle the call, the CPU 32 then may take steps to connect the call to the selected agent 22, 24, 26, 28. A matrix switch 36 is provided within the ACD 20 for purposes of interconnecting the detected call with an agent 22, 24, 26, 28.

The matrix switch 36 may be a well known multiple port device capable of connecting any first port to any second port. A set of incoming trunk lines 30 may be connected to a first set of ports of the matrix switch 36. The agents 22, 24, 26, 28 may be connected to a second set of ports of the switch 36.

The CPU 32 maintains a first list of ports connected to incoming trunks and a second list of ports connected to agents 22, 24, 26, 28. When the CPU 32 detects a call on one of the first set of ports, the CPU 32 selects an agent 22, 24, 26, 28 to handle the calls and instructs the matrix switch 36 to connect the call to the selected agent 22, 24, 26, 28.

The ACD 32 also has the capability of processing outgoing calls from agents (e.g., agent #1 at console 22). In general, the CPU 32 monitors each port of the switch 36 for changes in status. When the agent at console 22 goes off hook to make a call, the CPU 32 prepares itself to receive a set of dialed digits.

Upon receiving a set of dialed digits, the CPU 32 refers to a lookup table in memory 34 to identify an outgoing trunk to the selected destination of the call. Upon identification of the proper outgoing trunk, the CPU 32 may seize the trunk and transfer the dialed digits to the PSTN 18 as part of a call setup message.

Upon setup of the call connection, the PSTN 18 may send a call connect message to the CPU 32 of the ACD 20 announcing completion of the outgoing call. In response, the CPU 32 instructs the switch 36 to connect a first port of the seized trunk to the port of the dialing agent using console 22.

Upon occasion, emergency calls from agents using consoles 22, 24, 26, 28 must be processed. Such emergency calls, in the past, have presented a problem for ACDs where the consoles of the ACD 20 have been located at diverse locations. Such calls have been a problem in the past because a calling number provided to the PSTN 18 has been a general number of the ACD and not that of the calling agent.

Figure 2:
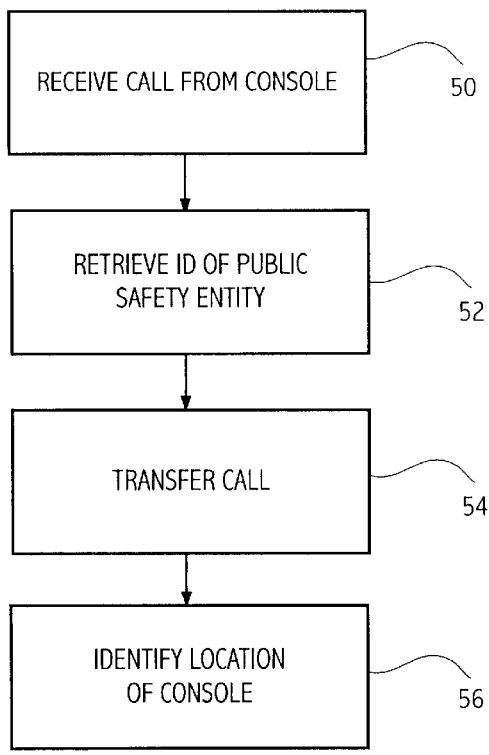
FIG. 2 is a flow chart of method steps that may be used by the system of FIG. 1.
Figure 3:
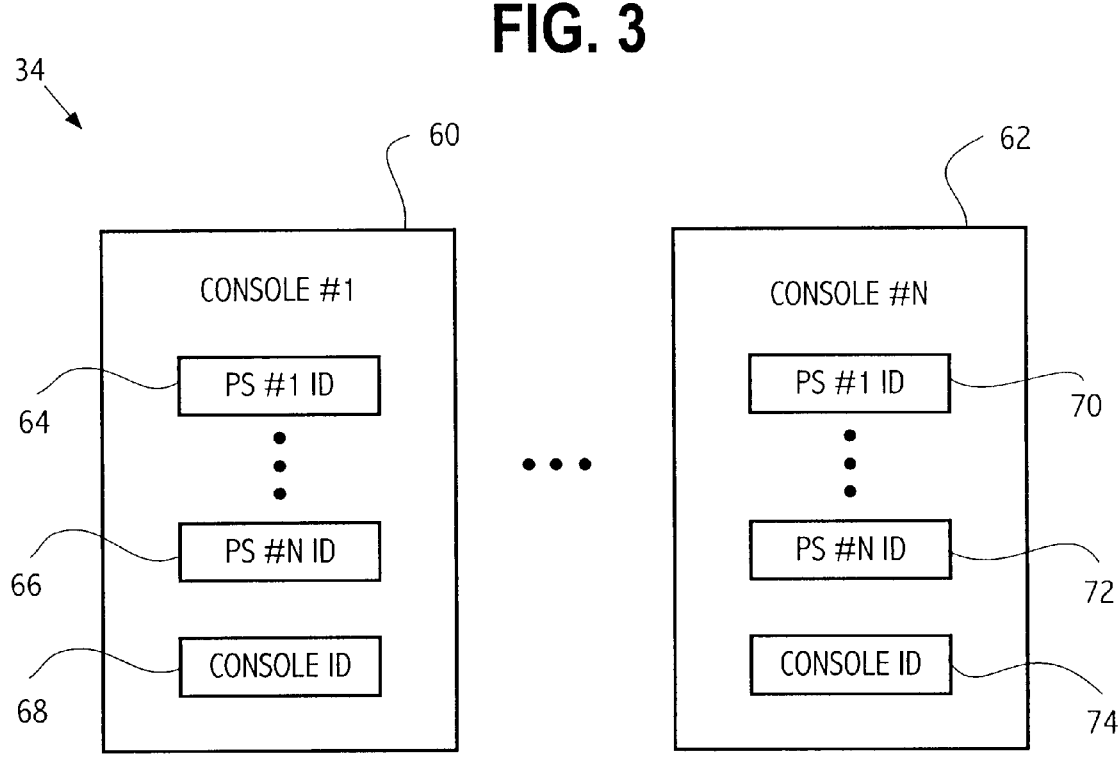
FIG. 3 depicts memory information contained in the ACD of FIG. 1.

Under the illustrated embodiment, an console information table 60, 62 (FIG. 3) may be provided within memory 34 of the ACD 20 for processing emergency calls from each agent. The console tables 60, 62 may be provided with an identifier of a predetermined public safety entity 16, 17 serving the local of the console 22, 24, 26, 28 and to provide a unique identifier of a calling console 22, 24, 26, 28. The agent tables 60, 62 may be used in accordance with the method steps of FIG. 2 to route calls to the appropriate public safety entity 16, 17 and to provide sufficient information to allow the public safety entity to adequately respond to the emergency.

The identifier of the public safety entity 16, 17 may be in the form of an identifier of a trunk line connecting the ACD 20 to a central office of the PSTN 18 that serves the predetermined public safety entity 16, 17. The unique identifier of the calling console 22, 24, 26, 28 may be in the form of a prefix and extension number of the console 22, 24, 26, 28. The prefix and extension number of the console 22, 24, 26, 28 may be used to access a file within a database 40, 42 of the public safety entity 16, 17. Such file may provide specific information regarding the location and environment of the calling console 22, 24, 26, 28.

In the event that an agent using console 22,, 24, 26, 28 experiences an emergency, the agent may enter the digits 9-1-1 on her console 22, 24, 26, 28. The CPU 32 of the ACD 20 may receive 50 (FIG. 2) and interpret the dialed sequence as a specific type of service access request related to emergencies.

To process the emergency service access request, the CPU 32 first determines the identity of the calling console 22, 24, 26, 28. The CPU 32 determines the identity of the console 22, 24, 26, 28 based upon the port of the switch 36 receiving the call.

More specifically, the consoles 22, 24, 26, 28 are defined to the CPU 32 (e.g., under the BellCore standards) using a set of well-known TL1 commands entered through a system maintenance terminal (SMT) 44. For example, a basic rate line (BRL) card (not shown) located within the ACD 20 which interfaces with the console 22, 24, 26, 28 may be identified to the CPU 32 by entering a slot number of the switching fabric 36 using an ENTER EQUIPMENT COMMAND. The entered slot number also inherently defines the port of the connected console 22, 24, 26, 28. The SMT 44 may complete identification of the console 22, 24, 26, 28 by defining the type of console 22, 24, 26, 28 using an ENTER DEVICE COMMAND.

Based upon the identity of the console 22, 24, 26, 28, the CPU 32 may retrieve the proper agent table 60, 62. It should be noted in passing that the specific console table 60, 62 retrieved is based upon the console 22, 24, 26, 28 initiating the call and not upon the identity of the caller. This is significant because ACDs normally track agents, not telephones.

Upon retrieving the proper agent table (e.g., 60), the CPU 32 may select a public safety entity 64, 66 to receive the call. A number of public safety entities 64, 66 may be listed in each agent table 60. A default public safety entity 64 may be reserved for 9-1-1 calls. Other public safety entities 66 may be accessed for different emergencies (e.g., fire) using a different service request (e.g., by dialing 8-1-1 from a console 22, 24, 26, 28).

If the emergency call is a 9-1-1call, the CPU 32 may retrieve 52 an identifier (e.g., a trunk identifier, or a trunk identifier and telephone number) 64 of the default public safety entity (e.g., 16). Using the identifier 64, the CPU 32 may seize the identified trunk 30 and transmit a call request to the PSTN 18. If the central office (not shown) of the PSTN 18 serving the ACD 20 supports 9-1-1calls, the call request may be in the form of a 9-1-1sequence. If not, then other number sequences (e.g., a 7-digit or 10-digit sequence) may be used.

In response to the call request, the PSTN 18 may return a request for caller (i.e., billing) information. The request may be used by the ACD 20 as a mechanism for supplying information to the predetermined public safety entity for purposes of identifying the console originating the call to the public safety entity 16, 17.

To supply a response to the request for caller information, the CPU 32 may forward the request to a centralized automated message accounting (CAMA) processor 38 (e.g., provided by Proctor and Assoc. of Redmond, Wash.). The CPU 32 may also forward an extension number of the calling console to the CAMA 38. The CAMA receives the extension number of the calling console and composes a response to the request for caller information including the extension and an exchange prefix. The composed message from the CAMA processor 38 is coupled through the seized trunk to the PSTN 18 as a response to the information request.

Upon receiving the response, the PSTN 18 functions to complete the call to the predetermined public safety entity 16, 17. As the call from the console arrives at the public safety entity 16, 17, the prefix and extension of the console is delivered to the public safety entity 16, 17 as channel associated (e.g., ANI) information.

By delivering the prefix and extension of the console to the public safety entity 16, 17, the public safety entity is able to reference a database 40, 42 (e.g., the Automatic Location Identifier (ALI) database) to access a file using the prefix and extension as an indicia of identify of the console. Contained within the file may be specific alpha-numeric information identifying the specific location of the console.

The specific alpha-numeric information for each console 22, 24, 26, 28 may be provided to the ALI under a number of different methods. For example, upon startup of the ACD system, 10 a disk file may be transferred to the public safety entities 16, 17 containing the appropriate information. Updates may be periodically provided to the public safety entities 16, 17, either by disk or by ISDN user-to-user information elements delivered through the PSTN 18.

A specific embodiment of a method and apparatus of processing emergency calls in an ACD according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of routing emergency calls received by an automatic call distributor from a plurality of agent workstation in diverse geographical locations, such method comprising the steps of:
   receiving an emergency call by the automatic call distributor from an agent workstation of the plurality of agent workstations;
   retrieving an identifier of a predetermined public safety entity responsible for serving the local of the workstation from a database of the automatic call distributor; and
   forwarding the call along with an identifier of the agent workstation to the public safety entity.

2. The method of routing the emergency call as in claim 1 further comprising identifying a location of the agent workstation within a database of the public safety entity using the transferred identifier of the agent workstation.

3. The method of routing the emergency call as in claim 1 further comprising identifying the agent workstation based upon an identity of a port of a switch of the automatic call distributor which received the call.

4. The method of routing the emergency call as in claim 1 further comprising identifying the agent workstation based upon a workstation identifier received by the automatic call distributor from the workstation along with the emergency call.

5. The method of routing the emergency call as in claim 1 wherein the step of retrieving an identifier of a predetermined public safety entity further comprises retrieving an identifier of a predefined trunk of a trunk group serving the automatic call distributor.

6. The method of routing the emergency call as in claim 5 further comprising transferring a public safety entity access number sequence through the identified predetermined trunk as a called number.

7. The method of routing the emergency call as in claim 6 wherein the public safety number sequence is further comprises 9-1-1.

8. The method of routing the emergency call as in claim 6 further comprising receiving the public safety number sequence by a central office of a connected public switch telephone network and connecting the automatic call distributor with the predetermined public safety entity.

9. The method of routing the emergency call as in claim 1 wherein the step of transferring the identifier of the agent workstation to the public safety entity further comprises transferring the identifier as an ISDN user-to-user information element.

10. The method of routing the emergency call as in claim 1 wherein the step of transferring the identifier of the agent workstation to the public safety entity further comprises transferring the identifier as channel associated information.

11. The method of routing the emergency call as, in claim 1 wherein the step of identifying a location of the agent workstation within a database of the public safety entity using the transferred identifier of the agent workstation further comprises entering an Automatic Location Identification database of the public safety entity using the identifier of the workstation.

12. An apparatus for routing emergency calls received by an automatic call distributor from a plurality of agent workstation in diverse geographical locations, such apparatus comprising:
    means for receiving an emergency call by the automatic call distributor from an agent workstation of the plurality of agent workstations;
    means for retrieving an identifier of a predetermined public safety entity responsible for serving the local of the workstation from a database of the automatic call distributor; and
    means for forwarding the call along with an identifier of the agent workstation to the public safety entity.

13. The apparatus for routing the emergency call as in claim 12 further comprising means for identifying a location of the agent workstation within a database of the public safety entity using the transferred identifier of the agent workstation.

14. The apparatus for routing the emergency call as in claim 12 further comprising means for identifying the agent workstation based upon an identity of a port of a switch of the automatic call distributor which received the call.

15. The apparatus for routing the emergency call as in claim 12 further comprising means for identifying the agent workstation based upon a workstation identifier received by the automatic call distributor from the workstation along with the emergency call.

16. The apparatus for routing the emergency call as in claim 12 wherein the means for retrieving an identifier of a predetermined public safety entity further comprises means for retrieving an identifier of a predefined trunk of a trunk group serving the automatic call distributor.

17. The apparatus for routing the emergency call as in claim 16 further comprising means for transferring a public safety entity access number sequence through the identified predetermined trunk as a called number.

18. The apparatus for routing the emergency call as in claim 17 wherein the public safety number sequence further comprises 9-1-1.

19. The apparatus for routing the emergency call as in claim 17 further comprising means for receiving the public safety number sequence by a central office of a connected public switch telephone network and connecting the automatic call distributor with the predetermined public safety entity.

20. The apparatus for routing the emergency call as in claim 12 wherein the means for transferring the identifier of the agent workstation to the public safety entity further comprises means for transferring the identifier as an ISDN user-to-user information element.

21. The apparatus for routing the emergency call as in claim 12 wherein the means for transferring the identifier of the agent workstation to the public safety entity further comprises means for transferring the identifier as channel associated information.

22. The apparatus for routing the emergency call as in claim 12 wherein the means for identifying a location of the agent workstation within a database of the public safety entity using the transferred identifier of the agent workstation further comprises means for entering an Automatic Location Identification database of the public safety entity using the identifier of the workstation.

23. An apparatus for routing emergency calls received by an automatic call distributor from a plurality of agent workstation in diverse geographical locations, such apparatus comprising:
 a call processor adapted to receive an emergency call by the automatic call distributor from an agent workstation of the plurality of agent workstations;
 a memory adapted to retrieve an identifier of a predetermined public safety entity responsible for serving the local of the workstation from a database of the automatic call distributor; and
 a call processor adapted to forward the call along with an identifier of the agent workstation to the public safety entity.

24. The apparatus for routing the emergency call as in claim 23 further comprising an Automatic Location Identifier within the public safety entity adapted to retrieve a location of the agent workstation based upon the identifier of the agent workstation.

25. The apparatus for routing the emergency call as in claim 23 further comprising a port identification processor adapted to identifying the agent workstation based upon an identity of a port of a switch of the automatic call distributor which received the call.

26. The apparatus for routing the emergency call as in claim 23 further comprising a workstation identifier adapted to be transferred to the automatic call distributor from the workstation along with the emergency call.

27. The apparatus for routing the emergency call as in claim 23 wherein the identifier of the public safety entity further comprises an identifier of a predefined trunk of a trunk group serving the workstation.

28. The apparatus for routing the emergency call as in claim 23 wherein the identifier of the public safety entity further comprising a public safety entity access number sequence adapted to be transferred through the identified predetermined trunk as a called number.

29. The apparatus for routing the emergency call as in claim 28 wherein the public safety number sequence further comprises 9-1-1.

30. The apparatus for routing the emergency call as in claim 28 further comprising a central office of a connected public switch telephone network adapted to receive the public safety entity access number.

31. The apparatus for routing the emergency call as in claim 30 wherein the central office further comprises an ISDN interface adapted to transfer the identifier as an ISDN user-to-user information element.

32. The apparatus for routing the emergency call as in claim 23 wherein the call processor further comprises a communication processor adapted to transfer the identifier of the agent workstation as channel associated information.

33. The apparatus for routing the emergency call as in claim 23 wherein the identifier of the agent workstation further comprises indicia of identity adapted to locate a location of the agent workstation within an Automatic Location Identification database of the public safety entity.

34. A method of routing emergency calls received by an automatic call distributor from a plurality of agent workstations, such method comprising the steps of:
 receiving an emergency call by the automatic call distributor from an agent workstation of the plurality of agent workstations;
 retrieving an identifier of a call routing path from a database of the automatic call distributor between the automatic call distributor and a predetermined public safety facility of the workstation;
 transferring the call to the public safety facility along with an identifier of the agent workstation; and
 identifying a location of the agent workstation within a database of the public safety facility using the identifier of the agent workstation.

* * * * *